US010547851B2

(12) United States Patent
Li et al.

(10) Patent No.: US 10,547,851 B2
(45) Date of Patent: Jan. 28, 2020

(54) METHOD FOR DECODING AT PICTURE AND SLICE LAYER ACCORDING TO A CONSTRAINED LOOP FILTER CONTROL FLAG

(71) Applicant: ZTE Corporation, Shenzhen, Guangdong (CN)

(72) Inventors: Ming Li, Shenzhen (CN); Ping Wu, Shenzhen (CN)

(73) Assignee: ZTE Corporation, Shenzhen (CN)

(*) Notice: Subject to any disclaimer, the term of this patent is extended or adjusted under 35 U.S.C. 154(b) by 726 days.

(21) Appl. No.: 14/650,942

(22) PCT Filed: Nov. 1, 2012

(86) PCT No.: PCT/CN2012/083941
§ 371 (c)(1),
(2) Date: Jul. 31, 2015

(87) PCT Pub. No.: WO2013/104205
PCT Pub. Date: Jul. 18, 2013

(65) Prior Publication Data
US 2015/0358623 A1      Dec. 10, 2015

(30) Foreign Application Priority Data
Jan. 9, 2012   (CN) .......................... 2012 1 0004194

(51) Int. Cl.
*H04N 7/173* (2011.01)
*H04N 19/159* (2014.01)
(Continued)

(52) U.S. Cl.
CPC ......... *H04N 19/159* (2014.11); *H04N 19/117* (2014.11); *H04N 19/172* (2014.11); *H04N 19/174* (2014.11); *H04N 19/82* (2014.11)

(58) Field of Classification Search
CPC .... H04N 19/117; H04N 19/164; H04N 19/70; H04N 19/82
See application file for complete search history.

(56) References Cited

U.S. PATENT DOCUMENTS

| 2011/0090967 A1 | 4/2011 | Chen et al. |
| 2012/0121188 A1 | 5/2012 | Kenji |
| 2012/0195380 A1 | 8/2012 | Wang et al. |

FOREIGN PATENT DOCUMENTS

| CN | 102118613 A | 7/2011 |
| CN | 102124739 A | 7/2011 |
| WO | 2011013580 A1 | 2/2011 |

OTHER PUBLICATIONS

International Search Report in international application No. PCT/CN2012/083941, dated Feb. 7, 2013.
(Continued)

*Primary Examiner* — Young Lee
(74) *Attorney, Agent, or Firm* — Perkins Coie LLP

(57) ABSTRACT

Disclosed are methods for coding and decoding at picture layer and slice layer, and corresponding coder and decoder. The method comprises: coder selecting, according to network transmission state and video characteristic, different constrained loop filter (CLF) and/or constrained intra-prediction (CIP) control modes for one of the following three objects: 1: different video sequences; 2: pictures in different periods in the same video sequence; 3: different slices in the same picture; according to the selected CLF and/or CIP control mode, coding CLF and/or CIP control flag bits in picture layer parameter set and slice layer parameter set; and a decoder parsing slice layer bitstream containing header information, picture layer parameter set and/or slice layer parameter set, and according to the obtained CLF and/or CIP control flag bits, decoding picture and slice by using the corresponding CLF and/or CIP control mode. Through the (Continued)

present invention, a desirable tradeoff can be achieved between coding efficiency and error resilience performance.

6 Claims, 10 Drawing Sheets

(51) Int. Cl.
*H04N 19/172* (2014.01)
*H04N 19/117* (2014.01)
*H04N 19/174* (2014.01)
*H04N 19/82* (2014.01)

(56) References Cited

OTHER PUBLICATIONS

English Translation of the Written Opinion of the International Search Authority in international application No. PCT/CN2012/083941, dated Feb. 7, 2013.

METHOD FOR DECODING AT PICTURE AND SLICE LAYER ACCORDING TO A CONSTRAINED LOOP FILTER CONTROL FLAG

TECHNICAL FIELD

The disclosure relates to video coding technology and in particular to methods for coding and decoding at picture layer and slice layer, coder and decoder, and an electronic device.

BACKGROUND

In order to improve the error resilience capability of a video bitstream in video communication, a coder usually uses error resilience coding tools in coding process to reduce mutual influence between a current coding unit and coded units, so that when a device receives a corrupted bitstream of a certain coding unit, it can still conceal the error using existing data with a high possibility, and reduce the negative influence on decoding the subsequent coding units to as a low degree as possible.

At present, a method of dividing a picture into one or more slices is adopted into High-Efficiency Video Coding (HEVC) standard to meet the limitation of a network transmission unit on maximum payload size. Meanwhile, the boundaries of the slices "break" the mutual prediction relationships among the spatial adjacent blocks in a picture, which improves the error resilience performance of bitstream of a coded picture with the cost of lowering coding efficiency.

In order to get a proper tradeoff between error resilience performance and coding efficiency, Constrained Loop Filter (CLF) mode is used to limit whether the pixels locating outside the boundaries of the current slice are allowed to be used by Loop Filter (LF) processing the pixels in the current slice or not. In HEVC, a flag bit loop_filter_across_slice_flag in Sequence Parameter Set (SPS) is used to indicate whether the LF crosses the boundaries of slices in sequence coding process. The LF may include Deblocking Filter (DF), Sample Adaptive Offset (SAO) filter, Adaptive Loop Filter (ALF) and the like.

A coder usually inhibits error propagation among pictures by utilizing a method of local refreshing a picture by introducing intra blocks. This process may employ Constrained Intra Prediction (CIP) mode to further control whether the pixels from the adjacent inter coded blocks that may be corrupted by error propagation will be employed as reference pixels for coding an intra refreshing block. In HEVC, a flag bit constraint_intra_pred_flag in Picture Parameter Set (PPS) is used to indicate whether CIP mode is used in coding a picture.

The existing method mainly has the following limitations.

1: Before encoding a video sequence, a coder may determine whether LF is allowed to cross slice boundaries or not according to network transmission state (such as congestion, bit error rate of a wireless channel, packet loss rate of a wired network and so on) acquired from the system, and set the flag bit loop_filter_across_slice_flag in SPS. If the network transmission state changes during the process of coding this video sequence, the coder cannot flexibly change the coding strategy of whether the LF crosses the slice boundaries or not. If taking a conservative strategy of always setting loop_filter_across_slice_flag equal to 0 (that is, the LF is not allowed to cross the slice boundaries), the coder cannot fully utilize LF to improve coding efficiency when the network is of good transmission state.

2: In existing HEVC, the coder may reinitialize the SPS to change parameter settings only by inserting an Instantaneous Decoding Refresh (IDR) picture so as to get a tradeoff between error resilience performance and coding efficiency. However, the newly inserted IDR picture and its subsequent coded pictures may always lead to a sudden and significant increment of coding bit rate, which further poses heavy pressure on network transmission.

3: The coder may use PPS to control the coding process of one picture or multiple pictures in a time period, but cannot separately control the slices in a picture. When it is determined according to the feedback information that different slices are influenced by the temporal error propagation to different extents, different coding control strategies of inserting intra refreshing blocks cannot be applied to different slices in the picture.

4: Different degrees of local influence brought by temporal error propagation would be imposed on decoded picture according to different characteristics of picture contents in the slices. Therefore, even under the condition that the blocks in a picture coded using inter prediction suffer from temporal error propagation with its influence (e.g. reconstruction error) of the same or similar degree, the coder using the existing approaches in HEVC cannot conduct separate control operations to the slices in the picture to pursue a better tradeoff between coding efficiency and error resilience performance.

In view of the abovementioned limitations in the existing technology, a better tradeoff between coding efficiency and error resilience performance cannot be achieved by the existing coding and decoding methods.

SUMMARY

Given that, the disclosure is intended to provide methods for coding and decoding at picture layer and slice layer, a coder and a decoder, and an electronic device, so as to make a better tradeoff between coding efficiency and error resilience performance.

To this end, the technical solutions of the disclosure are implemented as follows.

The disclosure provides a method for coding at picture layer and slice layer, which includes that:

a coder selects CLF and/or CIP control modes for one of the following three objects according to network transmission state and video content characteristic: 1, different video sequences; 2, pictures in different time periods in the same video sequence; 3, different slices in the same picture; and the coder codes CLF and/or CIP control flag bits in corresponding picture layer parameter set(s) and slice layer parameter set(s) according to the selected CLF and/or CIP control modes.

The picture layer parameter set can be PPS and Adaptation Parameter Set (APS); and the slice layer parameter set can be APS.

The step that the coder codes the CLF and/or CIP control flag bits in the picture layer parameter set and the slice layer parameter set is implemented as follows:

the CLF and CIP control flag bits are coded in the PPS;

or, the CLF control flag bit is coded in the PPS, and the CIP control flag bit is coded in the APS;

or, the CIP control flag bit is coded in the PPS, and the CLF control flag bit is coded in the APS;

or, the CLF and CIP control flag bits are coded in the APS.

The network transmission state includes at least one of: end-to-end delay, packet loss rate of wired network transmission and bit error rate of wireless network transmission.

The video content characteristic includes at least one of: texture complexity, motion intensity, picture motion, picture foreground and background.

Before the CLF and/or CIP control flag bits are coded in the corresponding picture layer parameter set and slice layer parameter set, the method further includes that:

the coder estimates a degree of influence of an error on current picture using different CLF and/or CIP control modes according to the network transmission state and the video content characteristic, and determines the CLF and/or CIP control modes for the corresponding video sequences, pictures or slices according to the estimated degree of influence.

The degree of influence of the error on the current picture includes at least one of: picture end-to-end distortion, reduction degree of the end-to-end distortion, end-to-end distortion of a subsequent coded picture(s) under the condition of the current picture with the error and an increase of the end-to-end distortion of the subsequent coded picture(s) under the influence of the error on the current picture; and correspondingly, the step that the coder determines the CLF and/or CIP control modes for the corresponding video sequences, pictures or slices according to the estimated degree of influence is implemented as follows: the CLF and/or CIP control modes for the corresponding video sequences, pictures or slices are determined according to an end-to-end rate-distortion optimization method.

The disclosure further provides a coder for picture layer and slice layer, which includes:

a control mode selection module configured to select CLF and/or a CIP control modes for one of the following three objects according to network transmission state and video content characteristic: 1, different video sequences; 2, pictures in different time periods in the same video sequence; 3, different slices in the same picture; and a flag bit coding module configured to code CLF and/or CIP control flag bits in corresponding picture layer parameter set and slice layer parameter set according to the selected CLF and/or CIP control modes.

The picture layer parameter set can be PPS and APS; and the slice layer parameter set can be APS.

It is implemented to code the CLF and/or CIP control flag bits in the picture layer parameter set and the slice layer parameter set as follows:

the CLF and CIP control flag bits are coded in the PPS;

or, the CLF control flag bit is coded in the PPS, and the CIP control flag bit is coded in the APS;

or, the CIP control flag bit is coded in the PPS, and the CLF control flag bit is coded in the APS;

or, the CLF and CIP control flag bits are coded in the APS.

The network transmission state includes at least one of: end-to-end delay, packet loss rate of wired network transmission and bit error rate of wireless network transmission.

The video content characteristic includes at least one of: texture complexity, motion intensity, picture motion, picture foreground and background.

The control mode selection module is further configured to estimate a degree of influence of an error on current picture under different CLF and/or CIP control modes according to the network transmission state and the video content characteristic, and determine the CLF and/or CIP control modes for the corresponding video sequences, pictures or slices according to the estimated degree of influence.

The degree of influence of the error on the current picture includes at least one of: picture end-to-end distortion, reduction degree of the end-to-end distortion, end-to-end distortion of a subsequent coded picture(s) under the condition of the current picture with the error and an increase of the end-to-end distortion of the subsequent coded picture(s) under the influence of the error on the current picture; and correspondingly, it is implemented to determine the CLF and/or CIP control modes for the corresponding video sequences, pictures or slices according to the estimated degree of influence as follows: the CLF and/or CIP control modes for the corresponding video sequences, pictures or slices are determined according to end-to-end rate-distortion optimization method.

The disclosure further provides a method for decoding at picture layer and slice layer, which includes that:

a decoder parses slice layer bitstream containing header information, picture layer parameter set and/or slice layer parameter set to obtain CLF and/or CIP control flag bits; and the decoder decodes picture and slice by using corresponding CLF and/or CIP control modes according to the obtained CLF and/or CIP control flag bits.

The picture layer parameter set can be PPS and APS; and the slice layer parameter set can be APS.

The step that the decoder parses the picture layer parameter set and/or the slice layer parameter set to obtain the CLF and/or CIP control flag bits is implemented as follows:

the PPS is parsed to obtain the CLF and CIP control flag bits;

or, the PPS is parsed to obtain the CLF control flag bit, and the APS is parsed to obtain the CIP control flag bit;

or, the PPS is parsed to obtain the CIP control flag bit, and the APS is parsed to obtain the CLF control flag bit;

or, the APS is parsed to obtain the CLF and CIP control flag bits.

The step that the decoder decodes picture and slice by using corresponding CLF and/or CIP control modes is implemented as follows:

availability of input pixels of loop filter in picture and slice decoding process is set according to the CLF control mode; and availability of reference pixels in intra prediction process is set according to the CIP control mode.

The disclosure further provides a decoder for picture layer and slice layer, which includes:

a flag bit acquisition module configured to parse slice layer bitstream containing header information, picture layer parameter set and/or slice layer parameter set to obtain CLF and/or CIP control flag bits; and a decoding module configured to decode picture and slice by using corresponding CLF and/or CIP control modes according to the obtained CLF and/or CIP control flag bits.

The picture layer parameter set can be PPS and APS; and the slice layer parameter set can be APS.

The flag bit acquisition module is specifically configured to parse the PPS to obtain the CLF and CIP control flag bits;

or, parse the PPS to obtain the CLF control flag bit, and parse the APS to obtain the CIP control flag bit;

or, parse the PPS to obtain the CIP control flag bit, and parse the APS to obtain the CLF control flag bit;

or, parse the APS to obtain the CLF and CIP control flag bits.

The decoding module is specifically configured to set availability of input pixels of loop filter in picture and slice decoding process according to the CLF control mode; and set availability of reference pixels in intra prediction process according to the CIP control mode.

The disclosure further provides an electronic device, which includes the abovementioned coder and/or decoder.

According to the methods for coding and decoding at picture layer and slice layer, a coder and a decoder, and an electronic device provided by the disclosure, the CLF and CIP control flag bits are coded in picture layer parameter set(s) and slice layer parameter set(s). The coder adaptively selects the CLF and/or CIP control modes for one of the following three objects based on the requirements in practice: 1, different video sequences; 2, pictures in different time periods in the same video sequence; and 3, different slices in the same picture. Thus, the CLF and CIP are used to improve error resilience performance of coded bitstream, taking coding efficiency of an LF and intra prediction into consideration, so that better tradeoff between coding efficiency and error resilience performance is made. Specifically, the disclosure has the following main benefits:

1: The CLF control flag bit is coded in picture layer parameter set(s) or the slice layer parameter set(s), and thus the CLF control flag bit is allowed to be set at picture layer or slice layer. With the effective range of the parameter set(s) referred to by a slice, the coder has the ability to adaptively select the CLF control mode for different video sequences, or pictures in different time periods in the same video sequence or different slices in the same picture according to the practical application requirements.

2: With the methods according to the disclosure, it is not necessary to recode and resend an SPS when the CLF control mode changes. Accordingly, when the CLF control mode changes, it is not necessary to resend an IDR picture to force the decoder to reinitialize the parameter configuration of the decoder according to the SPS. Therefore, the bit rate increase caused by all intra block coding of the IDR picture is eliminated, which relieves the network transmission pressure.

3: The CLF and/or CIP control flag bits are allowed to be coded in slice layer parameter set(s) according to the disclosure. With the effective range of the parameter set(s) referred to by a slice, the operation that the CLF and/or CIP control flag bits are allowed to be set in slice layer further enables the coder to adaptively select the CLF and/or CIP control modes for different slices in the same picture according to the practical application requirements, which thereby helps to conduct error resilience tool control in a sophisticated way considering the tradeoff between coding efficiency and error resilience performance.

4: On the basis of the third, advanced optimization control process can be designed for error resilience tools and applied to a coder, which enables the coder to achieve better tradeoff between coding efficiency and error resilience performance by selecting proper error resilience tools and setting corresponding control parameters for different slices in a picture, according to the factors including source characteristic of a slice, the influence of the slice on overall coding efficiency, the degree of the slice suffering from error and its influence on coding the subsequent slices to be coded, and so on.

DETAILED DESCRIPTION

The technical solutions of the disclosure are further described in detail below with reference to the drawings and specific embodiments.

The disclosure provides methods for coding and decoding at picture layer and slice layer, so as to make a better tradeoff between coding efficiency and error resilience performance, which mainly includes the following aspects:

1: To improve coding efficiency requires eliminating spatial domain redundancy and time domain redundancy in a single view video signal by utilizing spatial domain correlation and time domain correlation of pictures, slices and coding blocks as much as possible. It is specifically embodied in such a manner that a coder performs predictive coding on current coding unit by using coding information of adjacent coding units.

2: To improve the error resilience performance, coder needs to reserve some spatial domain redundancy information and/or time domain redundancy information in coding process, so that decoder may use such redundancy information to recover the picture content which cannot be correctly decoded under the influence of error. On the other hand, another way to improve the error resilience performance is restricting the availability of the information from the spatial and/or temporal adjacent coding units in processing the current coding unit, which reduces the degree of the influence of error propagation on the current coding unit.

3: Coder needs to take both factors of coding efficiency and error resilience performance into the consideration on the quality of the reconstructed video at destination. Coder needs to achieve a reasonable balance between the operations of "removing redundancy to improve coding efficiency" and "reserving redundancy to improve error resilience performance which is referred to as the tradeoff between coding efficiency and error resilience performance.

Figure 1A:
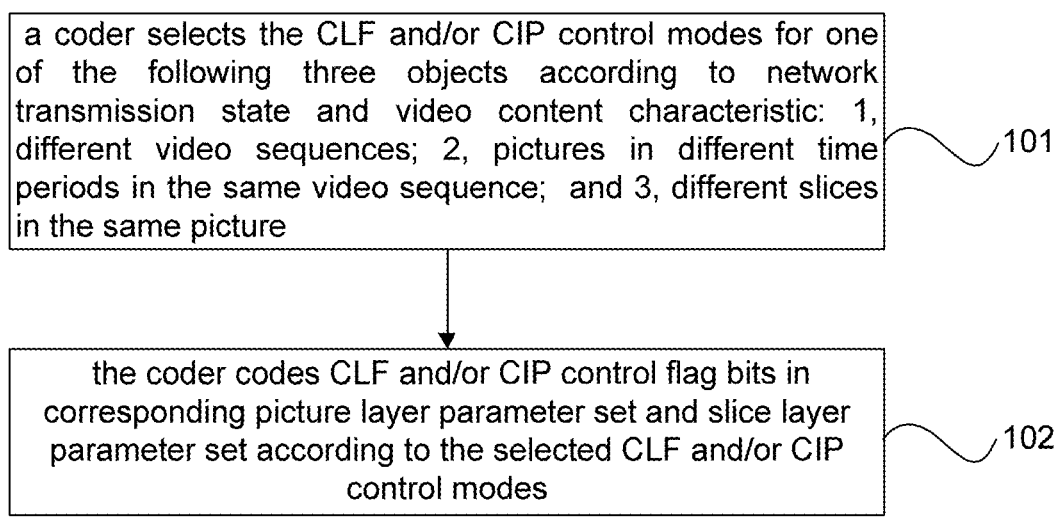
FIG. 1a is a flowchart of a method for coding at picture layer and slice layer according to the disclosure.

Therefore, as shown in FIG. 1a, the method for coding at picture layer and slice layer provided by the disclosure mainly includes the following steps.

Step 101: a coder selects the CLF and/or CIP control modes for one of the following three objects according to network transmission state and video content characteristic: 1, different video sequences; 2, pictures in different time periods in the same video sequence; and 3, different slices in the same picture.

The coder estimates the degree of influence of an error on current picture under different CLF and/or CIP control modes according to network transmission state and video content characteristic, and determines the CLF and/or CIP control modes for the corresponding video sequences, pictures or slices according to the estimated degree of influence.

Herein, the degree of influence of the error on the current picture includes at least one of: picture end-to-end distortion, reduction degree of the end-to-end distortion, end-to-end distortion of subsequent coded picture(s) under the condition of the current picture with the error and increase of the end-to-end distortion of the subsequent coded picture(s) under the influence of the error on the current picture.

Correspondingly, a method for determining the CLF and/or CIP control modes is end-to-end rate-distortion optimization method.

The network transmission state includes at least one of: end-to-end delay, packet loss rate of wired network transmission, bit error rate of wireless network transmission and the like.

The video content characteristic includes at least one of: texture complexity, motion intensity, picture motion, picture foreground and background and the like.

Step 102: the coder codes CLF and/or CIP control flag bits in corresponding picture layer parameter set and slice layer parameter set according to the selected CLF and/or CIP control modes.

Herein, the picture layer parameter set can be Picture Parameter Set (PPS) and an Adaption Parameter Set (APS); and the slice layer parameter set can be APS.

As a preferred implementation mode of the disclosure, the CLF and CIP control flag bits may be coded in the PPS;

or, the CLF control flag bit is coded in the PPS, and the CIP control flag bit is coded in the APS;

or, the CIP control flag bit is coded in the PPS, and the CLF control flag bit is coded in the APS;

or, the CLF and CIP control flag bits are coded in the APS.

Figure 1B:
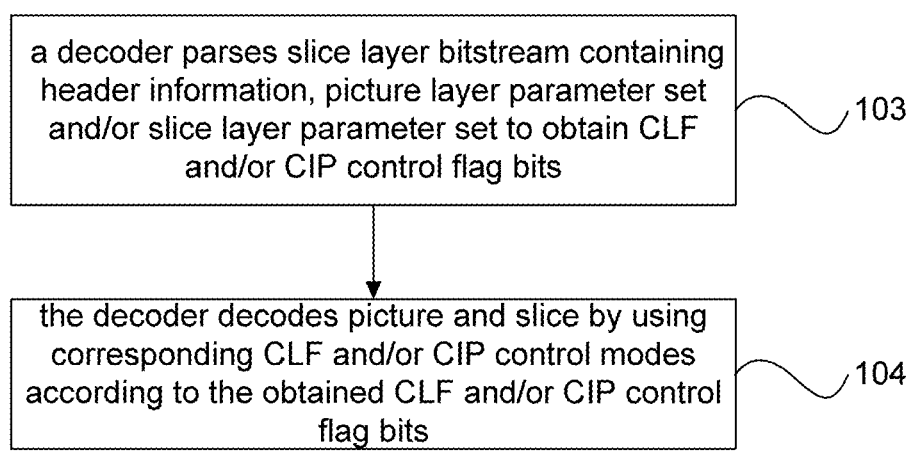
FIG. 1b is a flowchart of a method for decoding at picture layer and slice layer according to the disclosure.

As shown in FIG. 1b, a method for decoding at picture layer and slice layer provided by the disclosure mainly includes the following steps.

Step 103: a decoder parses slice layer bitstream containing header information, picture layer parameter set and/or slice layer parameter set to obtain CLF and/or CIP control flag bits.

Herein, the picture layer parameter set can be PPS and APS; and the slice layer parameter set can be an APS.

Step 104: the decoder decodes picture and slice by using corresponding CLF and/or CIP control modes according to the obtained CLF and/or CIP control flag bits.

The step that the decoder decodes the pictures and the slices by using corresponding CLF and/or CIP control modes includes that: availability of input pixels of loop filter in picture and slice decoding process is set according to the CLF control mode; and availability of reference pixels in intra prediction process is set according to the CIP control mode.

Corresponding to the abovementioned coding modes, if the CLF and CIP control flag bits are coded in the PPS, the PPS is parsed to obtain the CLF and CIP control flag bits; or if the CLF control flag bit is coded in the PPS and the CIP control flag bit is coded in the APS, the PPS is parsed to obtain the CLF control flag bit, and the APS is parsed to obtain the CIP control flag bit; or if the CIP control flag bit is coded in the PPS and the CLF control flag bit is coded in the APS, the PPS is parsed to obtain the CIP control flag bit, and the APS is parsed to obtain the CLF control flag bit; or if the CLF and CIP control flag bits are coded in the APS, the APS is parsed to obtain the CLF and CIP control flag bits.

Methods for coding and decoding at picture layer and slice layer according to the disclosure are further described in detail below with reference to specific embodiments.

The coder according to the embodiment of the disclosure may be used for a single picture, and may further be used for multiple continuous pictures in a certain time period (including the whole video sequence). Under the later application condition, using an error influence evaluation method in the embodiment, the coder may obtain reconstructed picture quality of the multiple continuous pictures in the time period under the influence of an error and picture coding quality after the time period, so as to further determine an overall CIP and/or CLF control methods for the pictures in the time period.

Embodiment 1

An SPS bitstream organization method used in Embodiment 1 of the disclosure is shown in Table 1 below:

TABLE 1

| seq_parameter_set_rbsp( ) { | Descriptor |
|---|---|
| ...... | |
| ~~loop_filter_across_slice_flag~~ | ~~u(1)~~ |
| sample_adaptive_offset_enabled_flag | u(1) |
| adaptive_loop_filter_enabled_flag | u(1) |
| pcm_loop_filter_disable_flag | u(1) |
| cu_qp_delta_enabled_flag | u(1) |
| temporal_id_nesting_flag | u(1) |
| inter_4x4_enabled_flag | u(1) |
| rbsp_trailing_bits( ) | |
| } | |

In the SPS bitstream organization method shown in Table 1, the strikethrough represents that a flag bit loop_filter_across_slice_flag is removed from the SPS bitstream organization method.

A PPS bitstream organization method used in the embodiment is shown in Table 2 below:

TABLE 2

| pic_parameter_set_rbsp( ) { | Descriptor |
|---|---|
| ...... | |
| constrained_intra_pred_flag | u(1) |
| loop_filter_not_across_slice_flag | u(1) |
| slice_granularity | u(2) |
| ...... | |
| } | |

In Table 2, the added loop_filter_not_across_slice_flag is configured to indicate whether loop filter (DF, SAO and/or ALF) is allowed to use pixels in other slices except the current decoded slice in the picture as input pixels of the filter in picture decoding process or not. When the value of the flag bit is 1, in decoding process of the picture referring to the PPS, loop filter shall not use the pixels in the other slices except the current decoded slice in the picture as the input pixels of the filter. When the value of the flag bit is 0, in decoding process of the current picture referring to the PPS, loop filter may use the pixels in the other slices except the current decoded slice in the picture as the input pixels of the filter.

The flag bit constrained_intra_pred_flag is configured to indicate whether reconstructed pixels in inter prediction coding blocks are allowed to be used as prediction reference pixels of intra prediction coding blocks or not in the picture decoding process. When the value of the flag bit is 1, decoding process of the picture referring to the PPS shall not use the reconstructed pixels in inter prediction coding blocks as the intra prediction reference pixels in the picture. When the value of the flag bit is 0, decoding process of the picture referring to the PPS may use the reconstructed pixels in the inter prediction coding blocks as the intra prediction reference pixels in the picture. Default value of the flag bit is 0.

Figure 2:
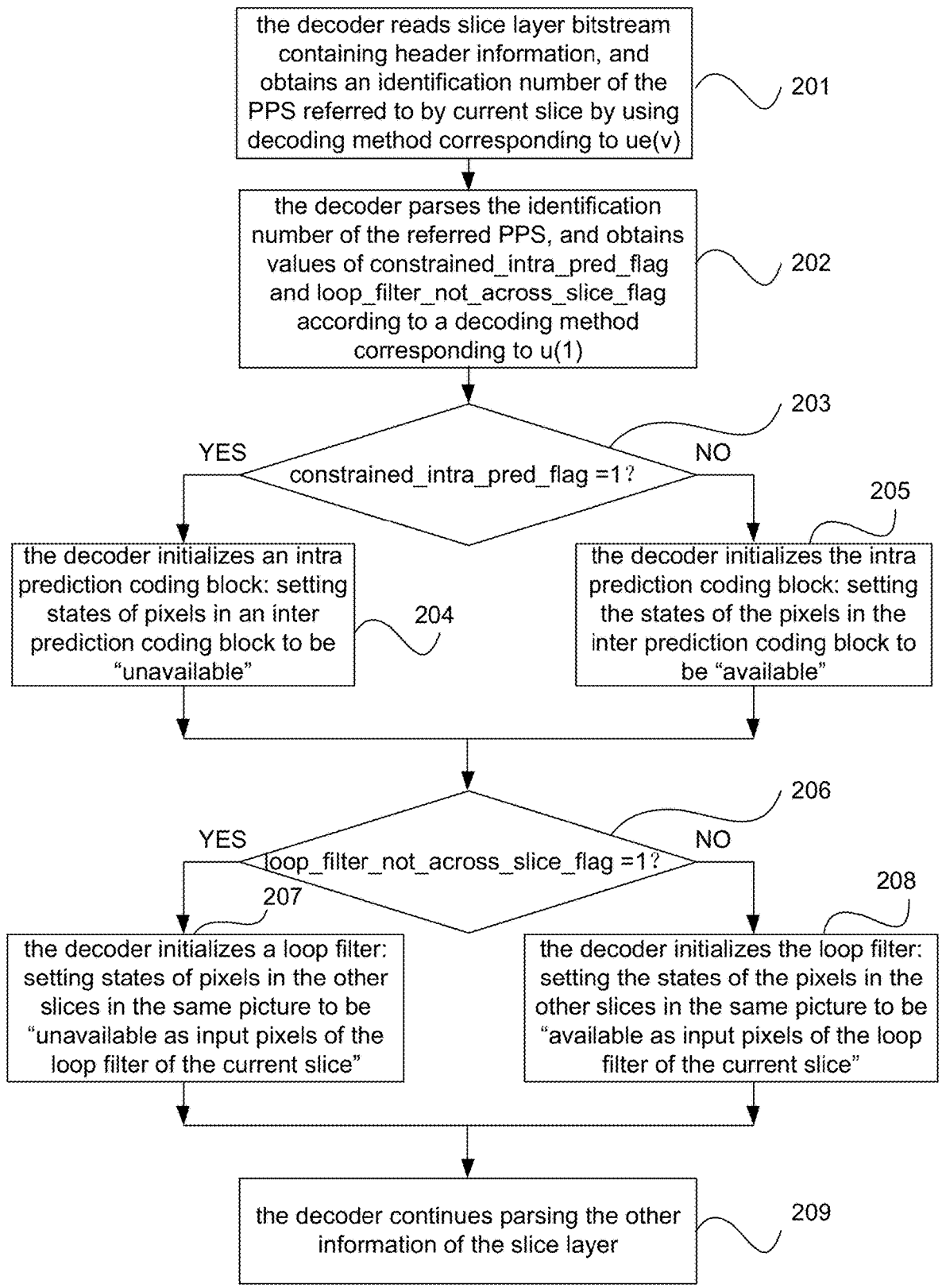
FIG. 2 is a flowchart of a decoding method according to a first embodiment of the disclosure.

The decoding method according to the embodiment, as shown in FIG. 2, mainly includes the following steps.

Step 201: the decoder reads slice layer bitstream containing header information, and obtains an identification number of the PPS referred to by current slice by using decoding method corresponding to ue(v). The decoding method corresponding to ue(v) is known, and is not repeated herein.

Step 202: the decoder parses the identification number of the PPS obtained in Step 201, and finds bitstream of the PPS in received bitstreams, and gets the values of constrained_intra_pred_flag and loop_filter_not_across_slice_flag in the bitstream of the PPS using decoding method corresponding to u(1), respectively. The decoding method corresponding to u(1) is known, and is not repeated herein.

Herein, constrained_intra_pred_flag is a CIP control flag bit, and loop_filter_not_across_slice_flag is a CLF control flag bit.

Step 203: the decoder determines whether the value of constrained_intra_pred_flag is 1 or not, and executes Step 204 if YES; otherwise, executes Step 205.

Step 204: the decoder initializes pixel availability judgment module of the intra prediction coding blocks. For each slice in the picture, the intra prediction reference pixels of the inter prediction coding blocks in the current slice are marked as "unavailable as intra prediction reference." Step 206 is executed.

In addition, the intrinsic restriction of the current slice is that the intra prediction reference pixels from the other slices are marked as "unavailable as intra prediction reference."

Step 205: the decoder initializes pixel availability judgment module of the intra prediction coding blocks. For each slice in the picture, the intra prediction reference pixels of the inter prediction coding blocks in the current slice are marked as "available as intra prediction reference." Step 206 is executed.

In addition, the intrinsic restriction of the current slice is that the intra prediction reference pixels from the other slices are marked as "unavailable as intra prediction reference."

Step 206: the decoder determines whether the value of loop_filter_not_across_slice_flag is 1 or not, and executes Step 207 if YES; otherwise, executes Step 208.

Step 207: the decoder initializes input pixel availability judgment module of the loop filter (DF, SAO and/or ALF), and marks reconstructed pixels in the slices in the picture other than the current slice as "unavailable as the input pixels of the loop filter in the decoding process of the slice." Step 209 is executed.

Step 208: the decoder initializes the input pixel availability judgment module of the loop filter (DF, SAO and/or ALF), and marks the reconstructed pixels in the picture as "available as the input pixels of the loop filter in the decoding process." Step 209 is executed.

Step 209: the decoder continues parsing the other information of the slice layer, and decodes the current picture.

Note that the values of constrained_intra_pred_flag and loop_filter_not_across_slice_flag are determined in such an order as listing these flag bits in the PPS bitstream organization mode shown in Table 2 in the embodiment.

Figure 3:
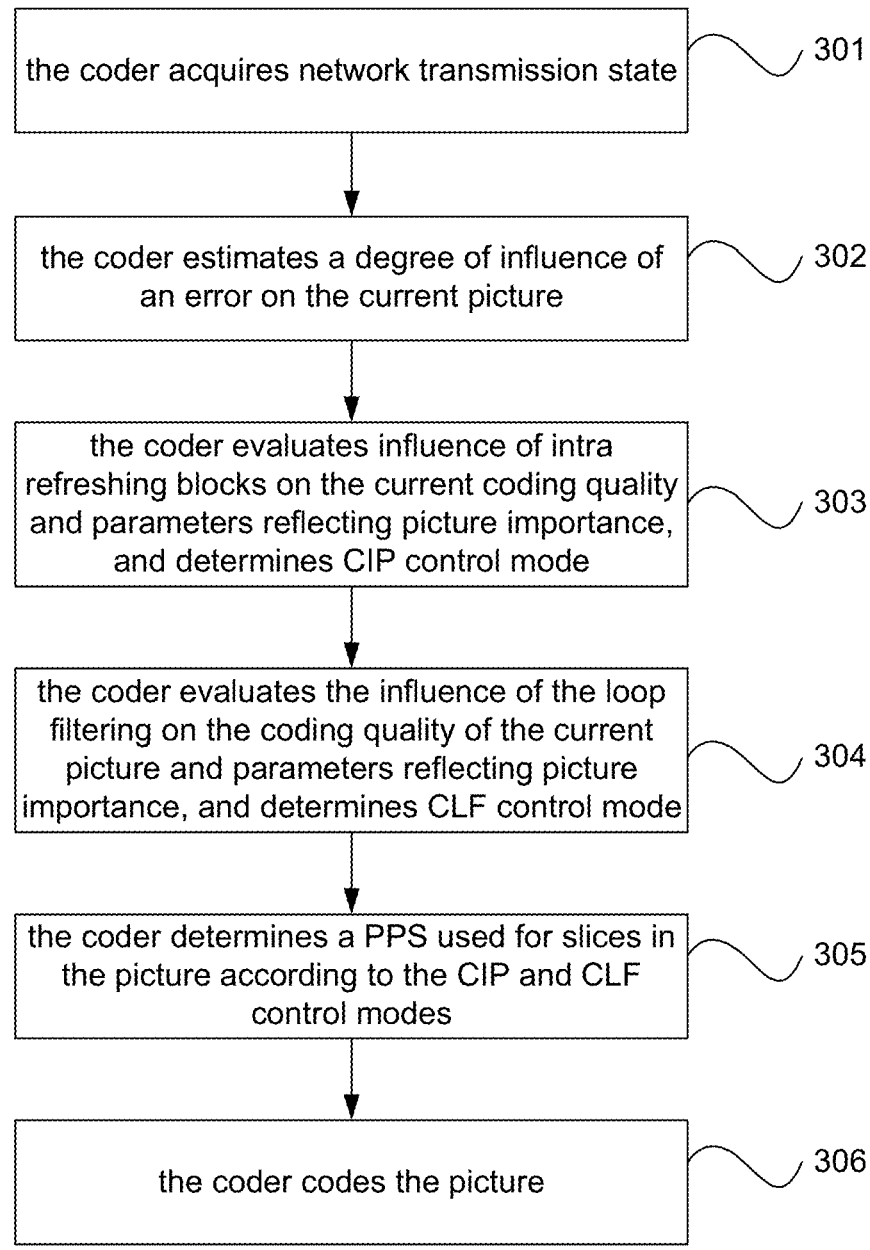
FIG. 3 is a flowchart of a coding method according to a first embodiment of the disclosure.

The coding process of the coder employing the PPS bitstream organization method according to the embodiment, as shown in FIG. 3, mainly includes the following steps.

Step 301: the coder acquires network transmission state.

The network transmission state may include at least one of the following parameters: end-to-end delay, packet loss rate of wired network transmission, bit error rate of wireless network transmission and the like.

A sender including the coder may obtain the current network transmission state using a common network state measurement method, and inform the obtained state parameters to the coder.

Step 302: the coder estimates the degree of influence of an error on the current picture.

The coder simulates the situation in which an error occurs in the current coded picture according to the obtained network transmission state, prediction coding structure for coding the input video and video content characteristic, evaluates the influence of the error on the reconstruction quality of the current picture and the influence on the quality of subsequent decoded picture(s), which reflects the degree of importance of the current picture.

The method may be as follows. If a certain coded unit in the picture cannot be correctly decoded due to an error, the coder performs the error concealment method that may be employed by the decoder to conceal the coded unit, and estimates the end-to-end distortion (including the loss compression coding distortion and the error concealment distortion) of the coded unit to measure the degree of influence of the error on the current coded unit using a probability statistical method. The coder estimates influence on the decoding quality of the subsequent picture(s) to be coded after the current coded unit influenced by the error using existing recursive computation method (such as ROPE algorithm) according to the prediction coding structure, which is measured with a numerical value as the end-to-end distortion. The coder estimates the degree of influence on the current picture and the subsequent coded picture(s) influenced by the error by evaluating the end-to-end distortion.

Step 303: the coder evaluates influence of intra refreshing blocks on the current coding quality and parameters reflecting picture importance, and determines CIP control mode.

The coder simulates the situation in which an error occurs in the current coded picture according to the obtained network transmission state, the video prediction coding structure and the video content characteristic.

The coder refreshes the current picture according to different application modes of the intra refreshing blocks, and evaluates the influence of the error on the current picture reconstruction quality and on the quality of the subsequent decoded picture(s).

The application modes of the intra refreshing block may include: randomly refreshing according to the ratio of the intra refreshing block in the picture; randomly refreshing according to the number of intra blocks in the picture; performing intra refreshing in a fixed refreshing mode (such as row-by-row refreshing, column-by-column refreshing, slice-by-slice refreshing and checkerboard type refreshing); and the like.

The coder may further determine an application parameter, such as the ratio of the intra refreshing block in the picture, of the refreshing mode according to the degree of the importance of the picture determined in Step 302.

The coder determines whether to use CIP for the current picture or not by existing judgment methods (such as an end-to-end rate-distortion optimization method) according to parameters such as the evaluated parameters (e.g. end-to-end distortion and reduction degree of the end-to-end distortion) of influence caused by the error obtained in the simulation process and a bit rate increase caused by intra refreshing by CIP mode.

Step 304: the coder evaluates the influence of the loop filtering on the coding quality of the current picture and parameters reflecting picture importance, and determines CLF control mode.

The coder simulates the situation in which an error occurs in the current coded picture according to the obtained network transmission state, the video prediction coding structure and the video content characteristic.

The coder may evaluate a degree of influence of the error on the current picture and a degree of influence on the quality of the subsequent coded picture(s) using existing measurement methods (such as end-to-end distortion) under conditions that the CLF mode is on and off, respectively.

The coder may further determine filter parameters, such as filtering intensity, number of filter taps and filter shape, used in the simulation process according to the degree of the importance of the picture determined in Step 302.

The coder determines whether to use CLF for the current picture or not by the existing judgment methods (such as the end-to-end rate-distortion optimization method) according to parameters such as the evaluated parameter (e.g. the end-to-end distortion and the reduction degree of the end-to-end distortion) of influence caused by the error obtained in the simulation process and bit rate increase or decrease caused by loop filtering in the CLF mode.

Step 305: the coder determines the PPS used for the slices in the picture according to the CIP and CLF control modes.

Step 306: the coder codes the picture according to the determined PPS.

The decoder according to the embodiment may correctly decode the bitstreams generated by the coder.

Embodiment 2

An SPS bitstream organization method used in the embodiment is the same as that in Table 1 in Embodiment 1.

A PPS bitstream organization method used in the embodiment is shown in Table 3 as follows:

TABLE 3

| pic_parameter_set_rbsp( ) { | Descriptor |
|---|---|
| ...... | |
| ~~constrained_intra_pred_flag~~ | ~~u(1)~~ |
| loop_filter_not_across_slice_flag | u(1) |
| slice_granularity | u(2) |
| ...... | |
| } | |

In Table 3, the strikethrough represents that a flag bit constrained_intra_pred_flag is removed from the PPS bitstream organization method. The added loop_filter_not_across_slice_flag is configured to indicate whether loop filter (DF, SAO and/or ALF) is allowed to use pixels in other slices except the current decoded slice in the picture as input pixels of the filter in picture decoding process or not. When the value of the flag bit is 1, in decoding process of the picture referring to the PPS, loop filter shall not use the pixels in the other slices except the current decoded slice in the picture as the input pixels of the filter. When the value of the flag bit is 0, in decoding process of the picture referring to the PPS, loop filter may use the pixels in the other slices except the current decoded slice in the picture as the input pixels of the filter.

An APS bitstream organization method used in the embodiment is shown in Table 4 as follows:

TABLE 4

| aps_rbsp( ) { | Descriptor |
|---|---|
| aps_id | ue(v) |
| aps_constrained_intra_pred_flag | u(1) |
| ...... | |
| } | |

In Table 4, the added aps_constrained_intra_pred_flag is configured to indicate whether reconstructed pixels in inter prediction coding blocks are allowed to be used as prediction reference pixels for intra prediction coding blocks or not in the slice decoding process. When the value of the flag bit is 1, decoding process of the slice referring to the APS shall not use the reconstructed pixels in the inter prediction coding blocks as the intra prediction reference pixels. When the value of the flag bit is 0, decoding process of the slice referring to the APS may use the restored pixels in the inter prediction coding blocks as the intra prediction reference pixels. Default value of the flag bit is 0.

Figure 4:
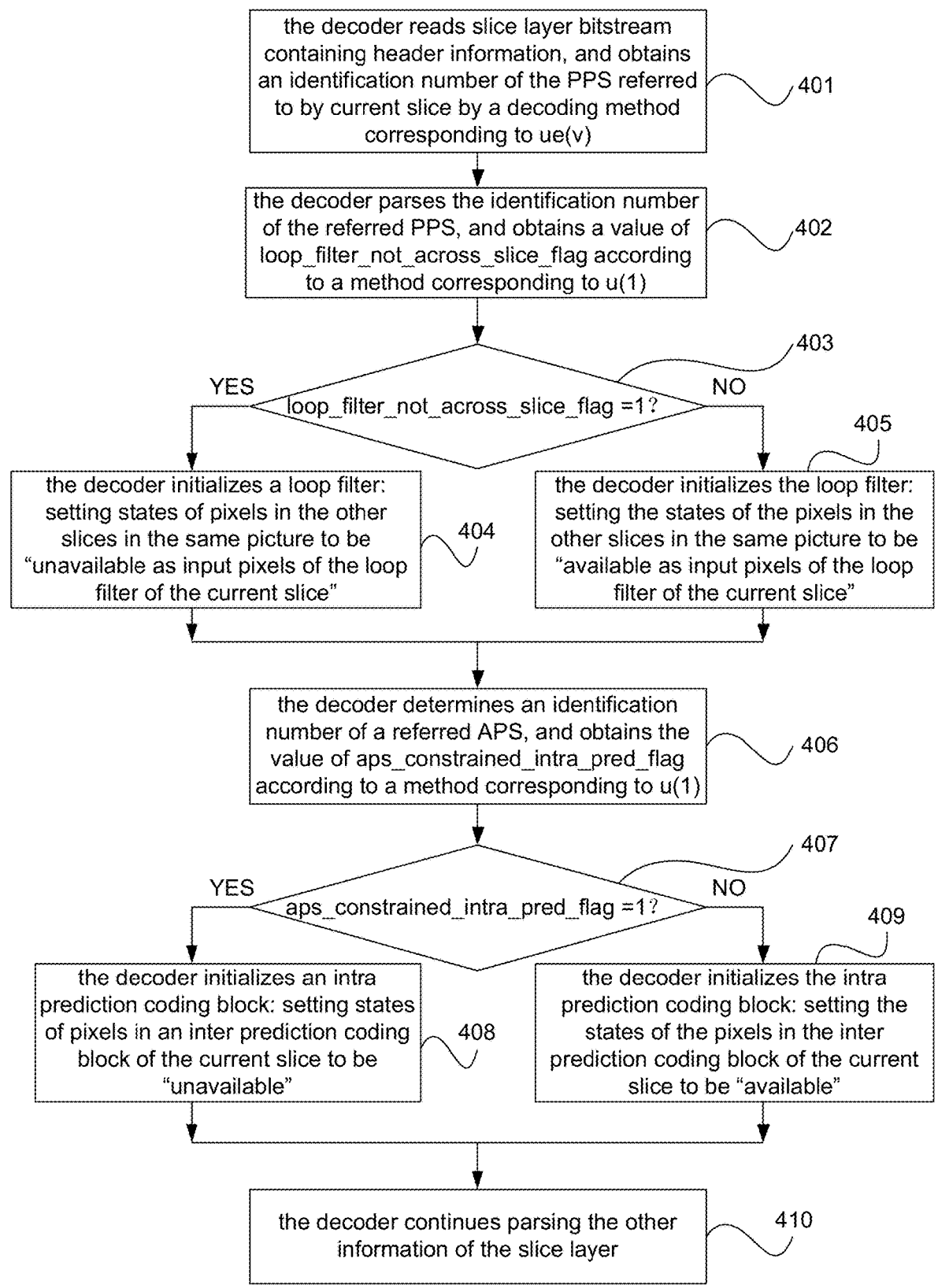
FIG. 4 is a flowchart of a decoding method according to a second embodiment of the disclosure.

The decoding method according to the embodiment, as shown in FIG. 4, mainly includes the following steps.

Step 401: the decoder reads slice layer bitstream containing header information, and obtains an identification number of the PPS referred to by current slice by a decoding method corresponding to ue(v).

Step 402: the decoder parses the identification number of the PPS obtained in Step 401, and finds bitstream of the PPS in the received bitstreams, and obtains the value of loop_filter_not_across_slice_flag in the bitstream of the PPS using decoding method corresponding to u(1).

Step 403: the decoder determines whether the value of loop_filter_not_across_slice_flag is 1 or not, and executes Step 404 if YES; otherwise executes Step 405.

Step 404: the decoder initializes input pixel availability judgment module of the loop filter (DF, SAO and/or ALF), and marks reconstructed pixels in the slices in the picture other than the current slice as "unavailable as the input pixels of the loop filter in the decoding process of the slice." Step 406 is executed.

Step 405: the decoder initializes the input pixel availability judgment module of the loop filter (DF, SAO and/or ALF), and marks the reconstructed pixels in the picture as "available as the input pixels of the loop filter in the decoding process." Step 406 is executed.

Step 406: the decoder obtains an identification number of APS referred to by the current slice using decoding method corresponding to ue(v), parses the identification number of the APS, finds bitstream of the APS in the received bitstreams, and determines the value of aps_constrained_intra_pred_flag in the bitstream of the APS.

When the decoder detects that the current slice does not refer to any APS, the value of aps_constrained_intra_pred_flag is set to be 0.

When the decoder detects that only one APS identification number is signalled in the current slice, the decoder parses the APS identification number, finds the bitstream of the APS in the received bitstreams, and further obtains the value of aps_constrained_intra_pred_flag using the decoding method corresponding to u(1).

When the decoder detects that multiple APS identification numbers are signalled in the current slice, the decoder obtains the identification number of each APS using the decoding method corresponding to ue(v) respectively, finds the bitstreams of the APSs referred to by the current slice in the received bitstreams, and further obtains the value of aps_constrained_intra_pred_flag using multi-APS bitstream parsing method.

Step 407: the decoder determines whether the value of aps_constrained_intra_pred_flag is 1 or not, and executes Step 408 if YES; otherwise executes Step 409.

Step 408: the decoder initializes pixel availability judgment module of the intra prediction coding blocks, and marks the intra prediction reference pixels of the inter prediction coding blocks in the current slice as "unavailable as intra prediction reference." Step 410 is executed.

In addition, the intrinsic restriction of the current slice is that the intra prediction reference pixels from the other slices are marked as "unavailable as intra prediction reference."

Step 409: the decoder initializes pixel availability judgment module of the intra prediction coding blocks, and marks the intra prediction reference pixels of the inter prediction coding block in the current slice to be "available as intra prediction reference." Step 410 is executed.

In addition, the intrinsic restriction of the current slice is that the intra prediction reference pixels from the other slices are marked as "unavailable as intra prediction reference."

Step 410: the decoder continues parsing the other information of the slice layer, and decodes the current picture.

Figure 5:
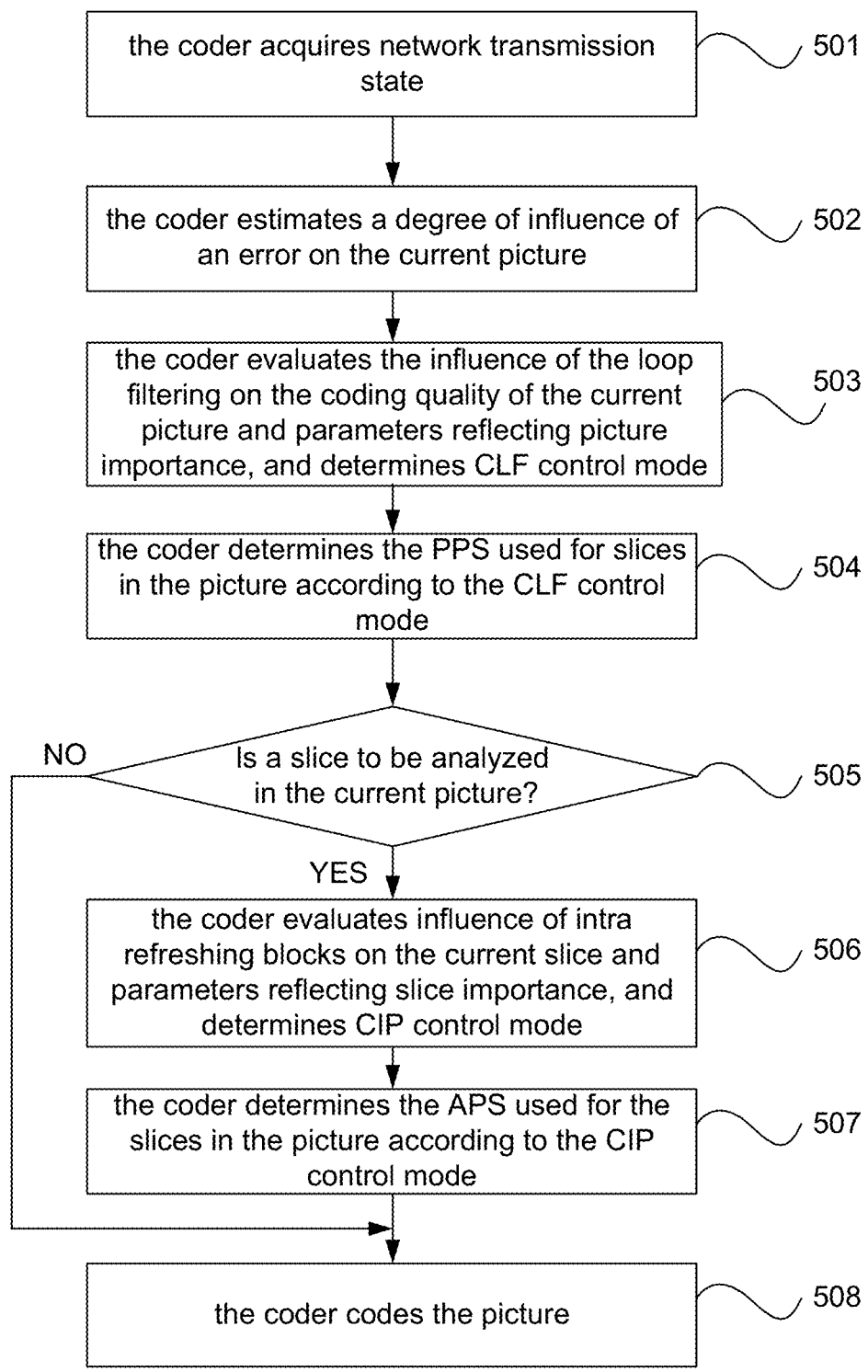
FIG. 5 is a flowchart of a coding method according to a second embodiment of the disclosure.

The coding process of the coder employing the PPS and APS bitstream organization methods according to the embodiment, as shown in FIG. 5, mainly includes the following steps.

Step 501: the same as Step 301.
Step 502: the same as Step 302.
Step 503: the same as Step 304.
Step 504: the coder determines the PPS used for the slices in the picture according to the CLF control mode.
Step 505: the coder determines whether there are one or more slices to be analyzed in the current picture or not, and executes Step 506 if YES; otherwise executes Step 508.
Step 506: the coder evaluates influence of intra refreshing blocks on the current slice and parameters reflecting slice importance, and determines CIP control mode.

The coder simulates the situation in which the error occurs in the current coded slice according to the obtained network transmission state, video prediction coding structure and video content characteristic.

The coder refreshes the current slice according to different application modes of the intra refreshing blocks, and evaluates the influence of the error on the current picture reconstruction quality and influence on the quality of the subsequent decoded picture(s).

The application modes of the intra refreshing block may include: randomly refreshing according to the ratio of the intra refreshing block in the slice; randomly refreshing according to the number of intra blocks in the slice; performing intra refreshing in a fixed refreshing mode (such as checkerboard type refreshing); and the like.

The coder may further determine an application parameter, such as the ratio of the intra refreshing block in the slice, of the refreshing mode according to the importance of the picture determined in Step 502.

The coder determines whether to use CIP for the current slice or not by existing judgment methods (such as end-to-end rate-distortion optimization method) according to parameters such as the evaluated parameters (e.g. end-to-end distortion and reduction degree of the end-to-end distortion) of influence caused by the error obtained in the simulation process and a bit rate increase caused by intra refreshing in a CIP mode.

Step 507: the coder determines the APS used for the slices in the picture according to the CIP control mode, returns to Step 505, executes the operations in Steps 505~507 on the other slices to be analyzed, and executes Step 508 until all the slices to be analyzed in the picture are subject to the operations in Steps 505~507.

Step 508: the coder codes the current picture according to the determined PPS and APS.

The decoder according to the embodiment may correctly decode the bitstreams generated by the coder.

Embodiment 3

An SPS bitstream organization method used in the embodiment is the same as that in Table 1 in Embodiment 1.

A PPS bitstream organization method used in the embodiment is the same as that in an existing method in HEVC, as shown in Table 5 below.

TABLE 5

| pic_parameter_set_rbsp( ) { | Descriptor |
|---|---|
| ...... | |
| constrained_intra_pred_flag | u(1) |
| slice_granularity | u(2) |
| ...... | |
| } | |

An APS bitstream organization method used for the embodiment is shown in Table 6 below.

TABLE 6

| aps_rbsp( ) { | Descriptor |
|---|---|
| aps_id | ue(v) |
| aps_loop_filter_not_across_slice_flag | u(1) |
| ...... | |
| } | |

In Table 6, the added aps_loop_filter_not_across_slice_flag is configured to indicate whether loop filter (DF, SAO and/or ALF) is allowed to use pixels of other slices in a picture as input pixels of the filter in slice decoding process or not. When the value of the flag bit is 1, in decoding process of the slice referring to the APS, the loop filter shall not use the pixels in the other slices except the current decoded slice in the picture as the input pixels of the filter. When the value of the flag bit is 0, in decoding process of the slice referring to the APS, the loop filter may use the pixels in the other slices except the current decoded slice in the picture as the input pixels of the filter.

Figure 6:
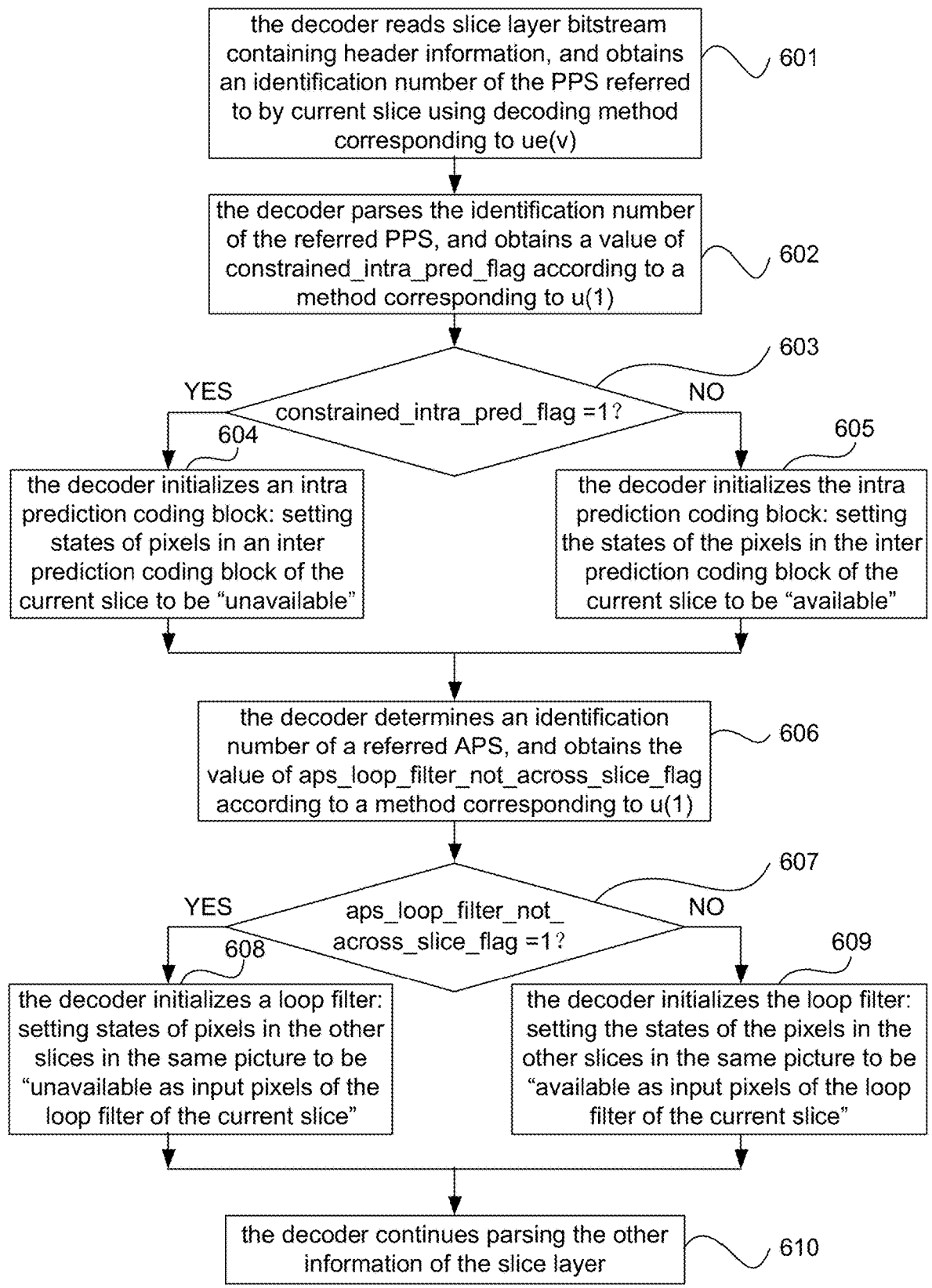
FIG. 6 is a flowchart of a decoding method according to a third embodiment of the disclosure.

The decoding method according to the embodiment, as shown in FIG. 6, mainly includes the following steps.

Step 601: the decoder reads slice layer bitstream containing header information, and obtains an identification number of the PPS referred to by current slice using decoding method corresponding to ue(v).

Step 602: the decoder parses the identification number of the PPS obtained in Step 601, and finds bitstream of the PPS in the received bitstreams. The value of constrained_intra_pred_flag in the bitstream of the PPS is obtained using decoding method corresponding to u(1).

Step 603: the decoder determines whether the value of constrained_intra_pred_flag is 1 or not and executes Step 604 if YES; otherwise executes Step 605.

Step 604: the decoder initializes pixel availability judgment module of the intra prediction coding blocks. For each slice in the picture, the intra prediction reference pixels of the inter prediction coding blocks in the current slice are marked as "unavailable as intra prediction reference." Step 606 is executed.

In addition, the intrinsic restriction of the current slice is that the intra prediction reference pixels from the other slices are marked as "unavailable as intra prediction reference."

Step 605: the decoder initializes pixel availability judgment module of the intra prediction coding blocks. For each slice in the picture, the intra prediction reference pixels of the inter prediction coding blocks in each slice are marked as "available as intra prediction reference." Step 606 is executed.

In addition, the intrinsic restriction of the current slice is that the intra prediction reference pixels from the other slices are marked as "unavailable as intra prediction reference."

Step 606: the decoder obtains an identification number of APS referred to by the current slice using decoding method corresponding to ue(v), parses the identification number of the APS, finds bitstream of the APS in the received bitstreams, and determines the value of aps_loop_filter_not_across_slice_flag in the bitstream of the APS.

When the decoder detects that the current slice does not referred to any APS, the value of aps_loop_filter_not_across_slice_flag is set to be 0.

When the decoder detects that only one APS identification number is signalled in the current slice, the decoder parses the identification number of the APS, finds the bitstream of the APS in the received bitstreams, and further obtains the value of aps_loop_filter_not_across_slice_flag using the decoding method corresponding to u(1).

When the decoder detects that multiple APS identification numbers are signalled in the current slice, the decoder obtains the identification number of each APS using the decoding method corresponding to ue(v) respectively, finds the bitstreams of the APSs referred to by the current slice in the received bitstreams, and further obtains the value of aps_loop_filter_not_across_slice_flag using multi-APS bitstream parsing method.

Step 607: the decoder determines whether the value of aps_loop_filter_not_across_slice_flag is 1 or not, and executes Step 608 if YES; otherwise executes Step 609.

Step 608: the decoder initializes input pixel availability judgment module of the loop filter (DF, SAO and/or ALF) and marks reconstructed pixels in the slices other than the current slice in the picture as "unavailable as the input pixels of the loop filter in the decoding process of the slice." Step 610 is executed.

Step 609: the decoder initializes input pixel availability judgment module of the loop filter (DF, SAO and/or ALF), and marks all the reconstructed pixels in the picture as "available as the input pixels of the loop filter in the decoding process." Step 610 is executed.

Step 610: the decoder continues parsing the other information of the slice layer, and decodes the current picture.

Figure 7:
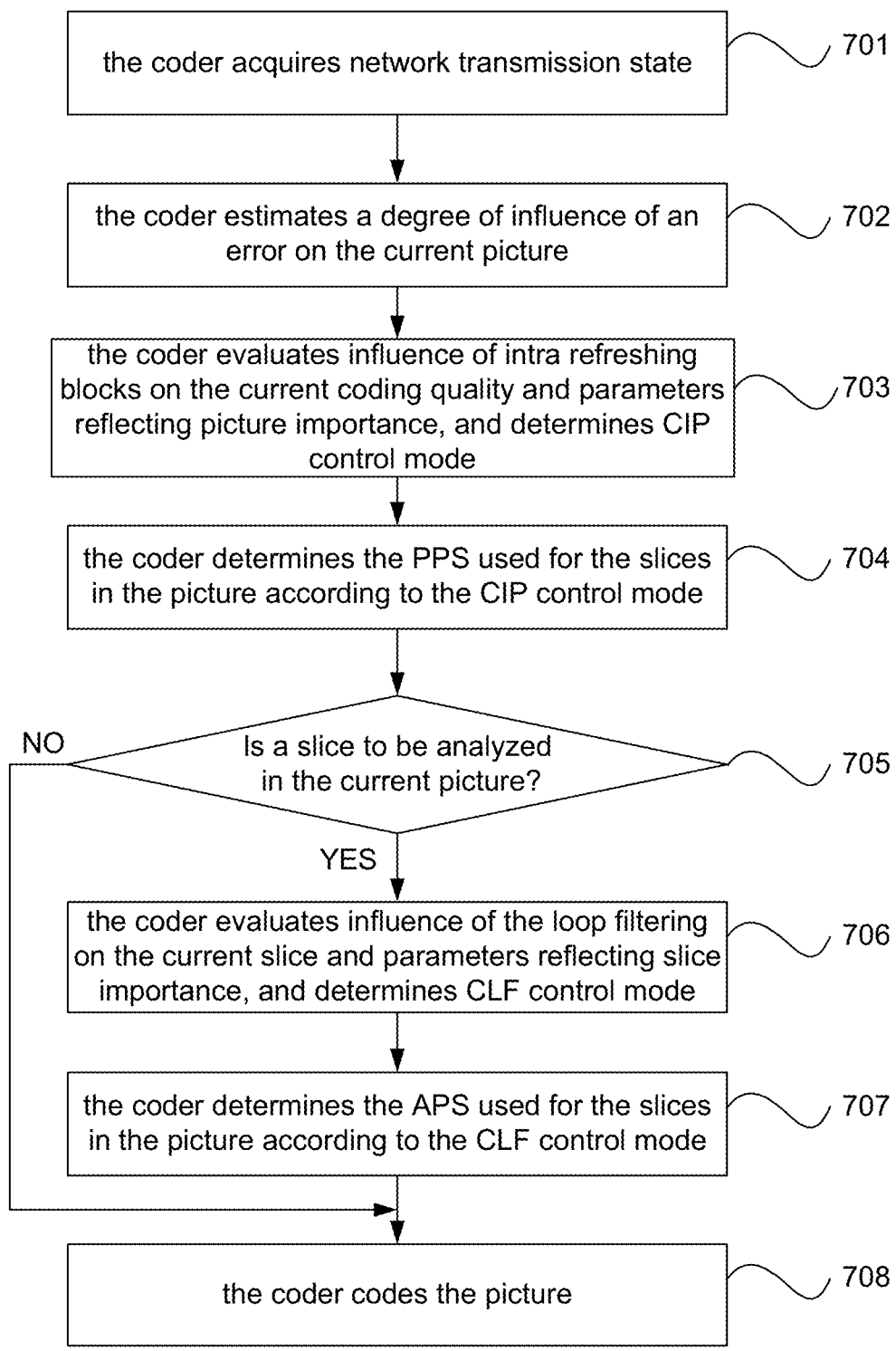
FIG. 7 is a flowchart of a coding method according to a third embodiment of the disclosure.

The coding process of the coder employing the PPS and APS bitstream organization methods according to the embodiment, as shown in FIG. 7, mainly includes the following steps.

Step 701: the same as Step 301.
Step 702: the same as Step 302.
Step 703: the same as Step 303.

Step 704: the coder determines the PPS used for the slices in the picture according to the CIP control mode.

Step 705: the coder determines whether there is one or more slices to be analyzed in the current picture or not, and executes Step 706 if YES; otherwise executes Step 708.

Step 706: the coder evaluates influence of the loop filtering on the current slice and parameters reflecting slice importance, and determines CLF control mode.

The coder simulates the situation in which the error occurs in the current coded slice according to the obtained network transmission state, the video prediction coding structure and the video content characteristic.

The coder may evaluate the degree of influence of the error on the current slice and the degree of influence on the quality of the subsequent coded picture(s) using an existing measurement methods (such as end-to-end distortion) under conditions that the CLF mode is on and off, respectively.

The coder may further determine filter parameters, such as filtering intensity, number of filter taps and filter shape, used in the simulation process according to the importance of the picture determined in Step 702.

The coder determines whether to use CLF for the current slice or not using the existing judgment methods (such as end-to-end rate-distortion optimization method) according to parameters such as the evaluated parameter (e.g. end-to-end distortion and reduction degree of the end-to-end distortion) of influence caused by the error obtained in the simulation process and bit rate increase caused by intra refreshing in the CLF mode.

Step 707: the coder determines the APS used for the slices in the picture according to the CLF control mode, returns to Step 705, executes the operations in Steps 705~707 on the other slices to be analyzed, and executes Step 708 until all the slices to be analyzed in the picture are subject to the operations in Steps 705~707.

Step 708: the coder codes the current picture according to the determined PPS and APS.

The decoder according to the embodiment may correctly decode the bitstreams generated by the coder.

Embodiment 4

An SPS bitstream organization method used in the embodiment is the same as that in Table 1 in Embodiment 1.

A PPS bitstream organization method used in the embodiment is shown in Table 7 below.

TABLE 7

| pic_parameter_set_rbsp( ) { | Descriptor |
|---|---|
| ...... | |
| ~~constrained_intra_pred_flag~~ | ~~u(1)~~ |
| slice_granularity | u(2) |
| ...... | u(1) |
| } | |

In Table 7, the strikethrough represents that a flag bit constrained_intra_pred_flag is removed from the PPS bitstream organization method.

An APS bitstream organization method used in the embodiment is shown in Table 8 below.

TABLE 8

| aps_rbsp( ) { | Descriptor |
|---|---|
| aps_id | ue(v) |
| aps_constrained_intra_pred_flag | u(1) |
| aps_loop_filter_not_across_slice_flag | u(1) |
| ...... | |
| } | |

In Table 8, the added aps_constrained_intra_pred_flag is configured to indicate whether reconstructed pixels in inter prediction coding blocks are allowed to be used as prediction reference pixels of current intra prediction coding block or not in slice decoding process. When the value of the flag bit is 1, decoding process of the slice referring to the APS shall not use the reconstructed pixels in the inter prediction coding blocks as the intra prediction reference pixels. When the value of the flag bit is 0, decoding process of the slice referring to the APS may use the reconstructed pixels in the inter prediction coding blocks as the intra prediction reference pixels. Default value of the flag bit is 0.

The added aps_loop_filter_not_across_slice_flag is configured to indicate whether loop filter (DF, SAO and/or ALF) is allowed to use pixels of other slices in the picture as input pixels of the filter in the slice decoding process or not. When the value of the flag bit is 1, decoding process of the slice referring to the APS shall not use the pixels in the other slices except the current decoded slice in the picture as the input pixels of the filter. When the value of the flag bit is 0, decoding process of the slice referring to the APS may use the pixels in the other slices except the current decoded slice in the picture as the input pixels of the filter. Default value of the flag bit is 0.

Figure 8:
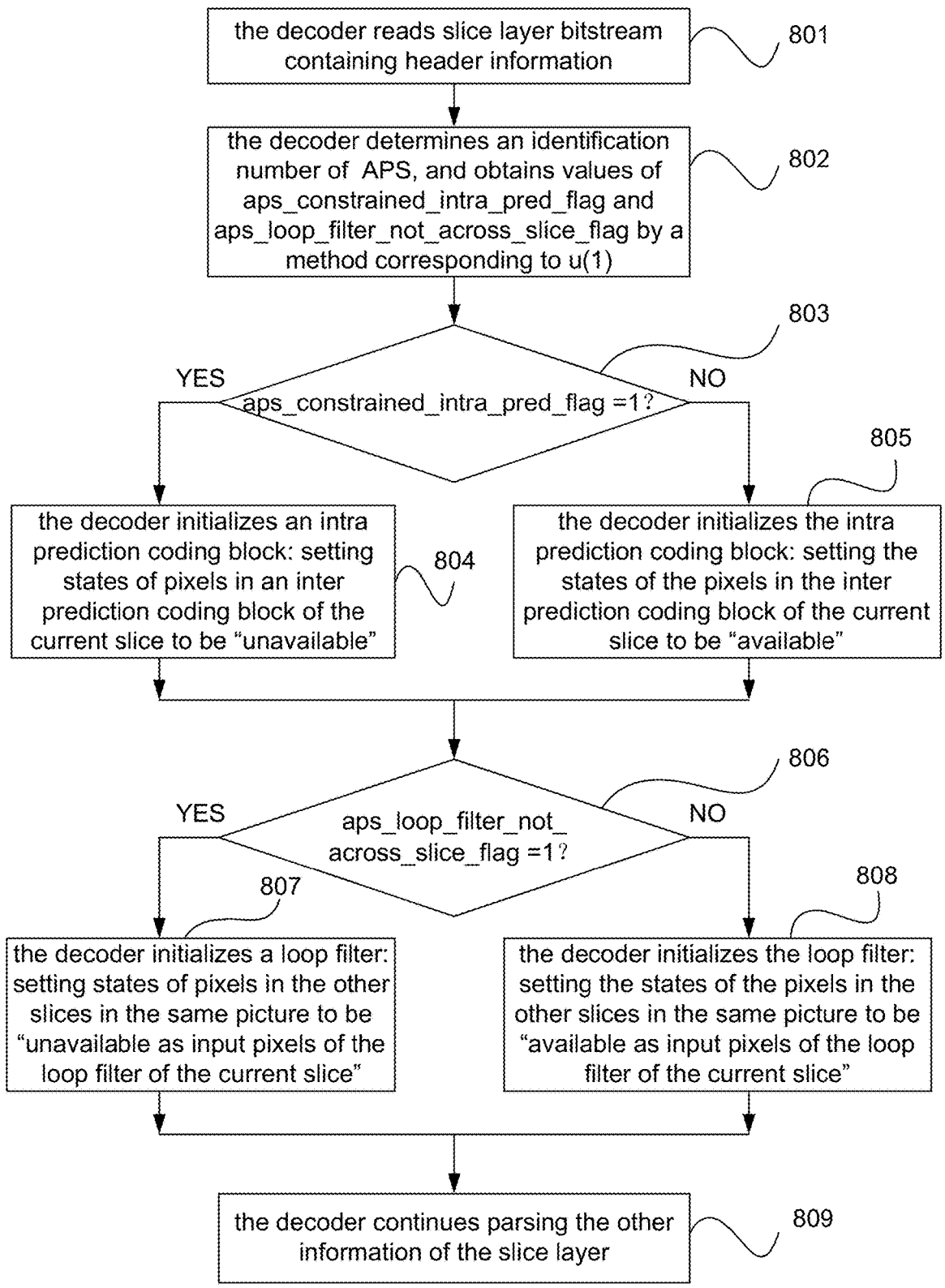
FIG. 8 is a flowchart of a decoding method according to a fourth embodiment of the disclosure.

The decoding method according to the embodiment, as shown in FIG. 8, mainly includes the following steps.

Step 801: the decoder reads slice layer bitstream containing header information.

Step 802: the decoder obtains APS identification number using a decoding method corresponding to ue(v), finds bitstream of the APS in the received bitstreams, and determines the values of aps_constrained_intra_pred_flag and aps_loop_filter_not_across_slice_flag in the bitstream of the APS.

When the decoder detects that the current slice does not referred to any APS, the value of aps_constrained_intra_pred_flag is set to be 0, and the value of aps_loop_filter_not_across_slice_flag is 0.

When the decoder detects that only one APS identification number is signalled in the current slice, the decoder parses the identification number of the APS, finds the bitstream of the APS in the received bitstreams, and further obtains the values of aps_constrained_intra_pred_flag and aps_loop_filter_not_across_slice_flag respectively using the decoding method corresponding to u(1).

When the decoder detects that multiple APS identification numbers are signalled in the current slice, the decoder obtains the identification number of each APS using the decoding method corresponding to ue(v), finds the bitstream of the APSs referred to by the current slice in the received bitstreams, and further obtains the values of aps_constrained_intra_pred_flag and aps_loop_filter_not_across_slice_flag respectively using multi-APS bitstream parsing method.

Step 803: the decoder determines whether the value of aps_constrained_intra_pred_flag is 1 or not, and executes Step 804 if YES; otherwise, executes Step 805.

Step 804: the decoder initializes pixel availability judgment module of the intra prediction coding blocks, and marks the intra prediction reference pixels in the inter prediction coding blocks in the current slice as "unavailable as intra prediction reference." Step 806 is executed.

In addition, the intrinsic restriction of the current slice is that the intra prediction reference pixels from the other slices are marked as "unavailable as intra prediction reference."

Step 805: the decoder initializes pixel availability judgment module of the intra prediction coding blocks, and marks the intra prediction reference pixels in the inter prediction coding blocks in the current slice as "available as intra prediction reference." Step 806 is executed.

In addition, the intrinsic restriction of the current slice is that the intra prediction reference pixels from the other slices are marked as "unavailable as intra prediction reference."

Step 806: the decoder determines whether the value of aps_loop_filter_not_across_slice_flag is 1 or not, and executes Step 807 if YES; otherwise, executes Step 808.

Step 807: the decoder initializes input pixel availability judgment module of the loop filter (DF, SAO and/or ALF), and marks the reconstructed pixels in the slices in the picture other than the current slice as "unavailable as the input pixels of the loop filter in the decoding process of the slice." Step 809 is executed.

Step 808: the decoder initializes input pixel availability judgment module of the loop filter (DF, SAO and/or ALF), and marks the reconstructed pixels in the picture as "available as the input pixels of the loop filter in the decoding process." Step 809 is executed.

Step 809: the decoder continues parsing the other information of the slice layer, and decodes the current slice.

Figure 9:
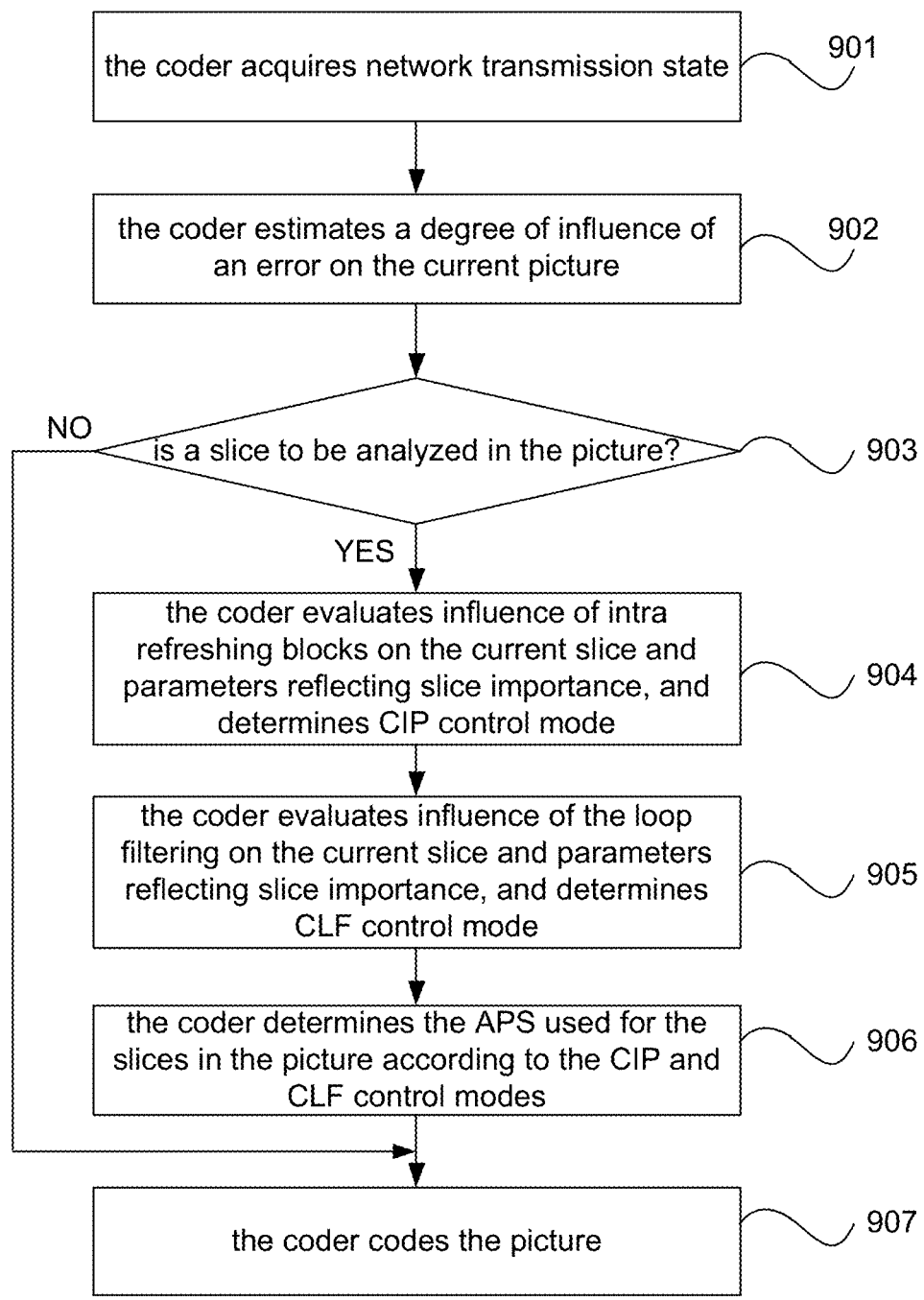
FIG. 9 is a flowchart of a coding method according to a fourth embodiment of the disclosure.

The coding process of the coder employing the APS bitstream organization method according to the embodiment, as shown in FIG. 9, mainly includes the following steps.

Step 901: the same as Step 301.
Step 902: the same as Step 302.
Step 903: the coder determines whether there is one or more slices to be analyzed in the picture or not, and executes Step 904 if YES; otherwise executes Step 907.
Step 904: the same as Step 506 in the Embodiment 2 regarding the coder.
Step 905: the same as Step 706 in the Embodiment 3 regarding the coder.
Step 906: the coder determines the APS used for the slices in the picture according to the CIP and CLF control modes, returns to Step 903, executes the operations in Steps 903~906 on the other slices to be analyzed, and executes Step 907 until all the slices to be analyzed in the picture are subject to the operations in Steps 903~906.
Step 907: the coder codes the picture according to the determined APS.

The decoder according to the embodiment may correctly decode the bitstreams generated by the coder.

Figure 10:
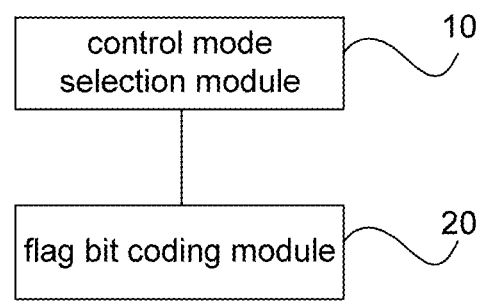
FIG. 10 is a structural diagram of a coder at picture layer and slice layer according to the disclosure.

Corresponding to the method for coding at picture layer and slice layer according to the disclosure, the disclosure further provides a coder for picture layer and slice layer, as shown in FIG. 10, including: a control mode selection module 10 and a flag bit coding module 20.

Herein, the control mode selection module 10 may select the CLF and/or CIP control modes for one of the following three objects according to network transmission state and video content characteristic: 1, different video sequences; 2, pictures in different time periods in the same video sequence; 3, different slices in the same picture. Specifically, the control mode selection module 10 may estimate the degree of influence of an error on current picture in different CLF and/or CIP control modes according to the network transmission state and the video content characteristic, and determine the CLF and/or CIP control modes selected for the corresponding video sequences, pictures or slices according to the estimated degree of influence.

The flag bit coding module 20 may code CLF and/or CIP control flag bits in corresponding picture layer parameter set and slice layer parameter set according to the selected CLF and/or CIP control modes.

Figure 11:
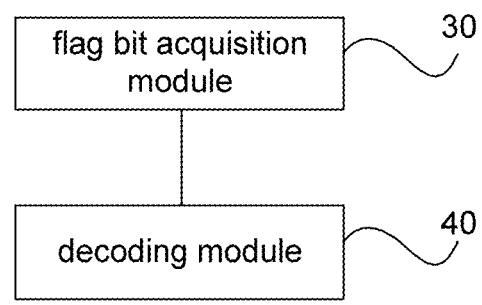
FIG. 11 is a structural diagram of a decoder at picture layer and slice layer according to the disclosure.

Corresponding to the method for decoding at picture layer and slice layer according to the disclosure, the disclosure further provides a decoder for picture layer and slice layer, as shown in FIG. 11, including: a flag bit acquisition module 30 and a decoding module 40.

Herein, the flag bit acquisition module 30 may parse slice layer bitstream containing header information, picture layer parameter set and/or slice layer parameter set to obtain CLF and/or CIP control flag bits.

The decoding module 40 may decode picture and slice by using corresponding CLF and/or CIP control modes according to the obtained CLF and/or CIP control flag bits. Specifically, decoding is implemented by setting availability of input pixels of loop filter in picture and slice decoding process according to the CLF control mode and setting availability of a reference pixels in intra prediction process according to the CIP control mode.

Preferably, the flag bit acquisition module 30 may further parse PPS to obtain the CLF and CIP control flag bits;

or, parse PPS to obtain the CLF control flag bit and parse APS to obtain the CIP control flag bit;

or, parse PPS to obtain the CIP control flag bit and parse APS to obtain the CLF control flag bit;

or, parse APS to obtain the CLF and CIP control flag bits.

In addition, the disclosure further provides an electronic device which includes the coder, as shown in FIG. 10, for coding original input video signal using the coding method according to the disclosure and outputting coded bitstream. The electronic device further includes the decoder, as shown in FIG. 11, for decoding the bitstream using the decoding method according to the disclosure and outputting the reconstructed video signal.

The electronic device in the disclosure may be a relevant bitstream generation equipment and a receiving and playing equipment in video communication application, such as a mobile phone, a computer, a server, a set-top box, a portable mobile terminal, a digital television, a digital camera and so on.

The above is only the preferred embodiment of the disclosure and not intended to limit the scope of protection of the disclosure.

What is claimed is:

1. A method for decoding at a slice layer of a video, comprising:
    parsing, by a decoder, a slice layer of a bitstream containing header information to obtain an identification number of a parameter set referred to by a current slice of the video;
    parsing, by the decoder, the identification number to obtain a value of a constrained_intra_pred_flag;
    upon determining that the constrained_intra_pred_flag is equal to 1, initializing an intra prediction block and marking pixels of inter predicted coding blocks in the current slice as unavailable as an intra prediction reference;
    upon determining that the constrained_intra_pred_flag is not equal to 1, marking pixels of inter predicted coding blocks in the current slice to be available as the intra prediction reference;
    parsing, by the decoder, the slice layer of the bitstream containing header information to obtain a flag that controls application of a loop filter across slices of the video;
    upon determining that the flag is equal to one, initializing the loop filter and setting a state of pixels in another slice as being unavailable for loop filtering the current slice;
    upon determining that the flag is not equal to one, initializing the loop filter and setting a state of pixels of the another slice as being available for the loop filtering of the current slice;
    the method further including:
    parsing, by a decoder, another slice layer of the bitstream containing header information to obtain a Constrained Loop Filter (CLF) control flag;
    decoding, by the decoder, another slice by using a corresponding CLF control mode according to the obtained CLF control flag;
    wherein the CLF control flag is set either at a picture layer or at the another slice layer; and
    wherein the parsing includes:
    obtaining the CLF control flag from a slice layer parameter set for the another slice if the CLF control flag is set at the another slice layer, and otherwise
    obtaining the CLF control flag from a picture parameter set of a picture containing the another slice, and
    wherein the step of decoding the another slice by using the corresponding CLF control mode comprises:
    setting availability of Loop Filter (LF) input pixels in slice decoding process according to the CLF control mode; and
    performing further parsing of information at the another slice layer.

2. The method according to claim 1, wherein the bitstream includes:
    a picture layer parameter set that is a Picture Parameter Set (PPS) and Adaptation Parameter Set (APS); and the slice layer parameter set includes an adaptation parameter set APS.

3. The method according to claim 2, wherein the step of parsing the slice layer parameter set to obtain the CLF control flag comprises:
    parsing the PPS to obtain the CLF control flag;
    or, parsing the APS to obtain the CLF control flag.

4. An electronic device comprising decoder, configured for decoding a video by:
    parsing, by a decoder, a slice layer of a bitstream containing header information to obtain an identification number of a parameter set referred to by a current slice of the video;
    parsing, by the decoder, the identification number to obtain a value of a constrained_intra_pred_flag;
    upon determining that the constrained_intra_pred_flag is equal to 1, initializing an intra prediction block and marking pixels of inter predicted coding blocks in the current slice as unavailable as an intra prediction reference;
    upon determining that the constrained_intra_pred_flag is not equal to 1, marking pixels of inter predicted coding blocks in the current slice to be available as the intra prediction reference;
    parsing, by the decoder, the slice layer of the bitstream containing header information to obtain a flag that controls application of a loop filter across slices of the video;

upon determining that the flag is equal to one, initializing the loop filter and setting a state of pixels in another slice as being unavailable for loop filtering the current slice;

upon determining that the flag is not equal to one, initializing the loop filter and setting a state of pixels of the another slice as being available for the loop filtering of the current slice;

parsing another slice layer of the bitstream containing a header information, a picture layer parameter set and/or a slice layer parameter set to obtain Constrained Loop Filter (CLF) and/or Constrained Intra Prediction (CIP) control flag bits;

wherein the CLF control flag is obtained from either the slice layer parameter set, or in absence of the CLF control flag in the slice layer parameter set, from the picture layer parameter set; and decoding a picture and a slice by using corresponding CLF and/or CIP control modes according to the obtained CLF and/or CIP control flag bits;

setting availability of loop filter input pixels in picture and slice decoding process according to the CLF control mode; and/or to set availability of reference pixels in intra prediction process according to the CIP control mode.

5. The electronic device according to claim 4, wherein the picture layer parameter set can be Picture Parameter Set (PPS) and Adaptation Parameter Set (APS); and the slice layer parameter set can be APS.

6. The electronic device according to claim 4, wherein the bitstream includes:

a picture layer parameter set that is a Picture Parameter Set (PPS) and Adaptation Parameter Set (APS); and the slice layer parameter set includes an adaptation parameter set APS.

* * * * *